Figure 1:
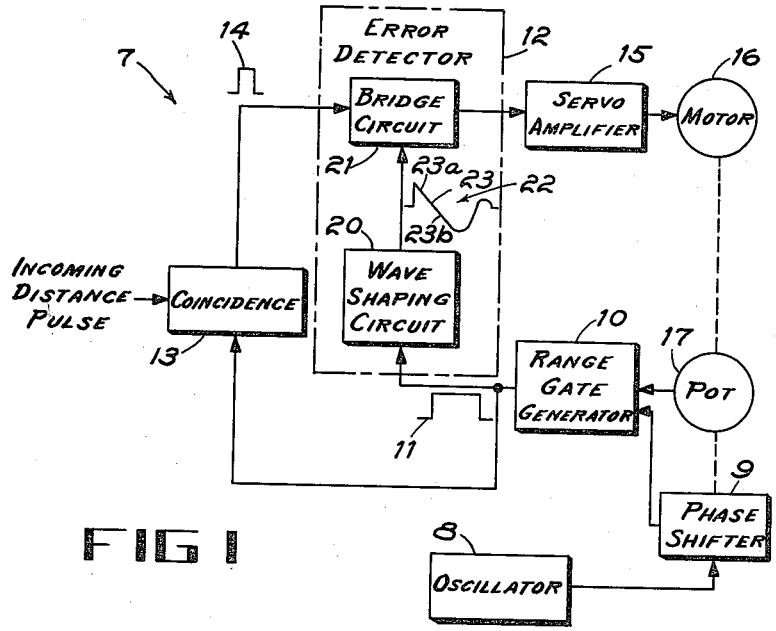

Jan. 7, 1964 K. J. ENGHOLM ETAL 3,117,315
SIMPLIFIED PULSE ERROR DETECTOR
Filed June 22, 1960 2 Sheets-Sheet 1

INVENTORS
KENNETH J. ENGHOLM
JOHN B. MAJERUS
BY Moody and Harris
ATTORNEYS

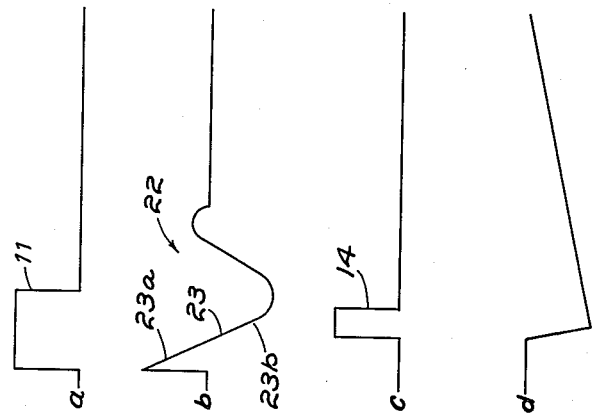
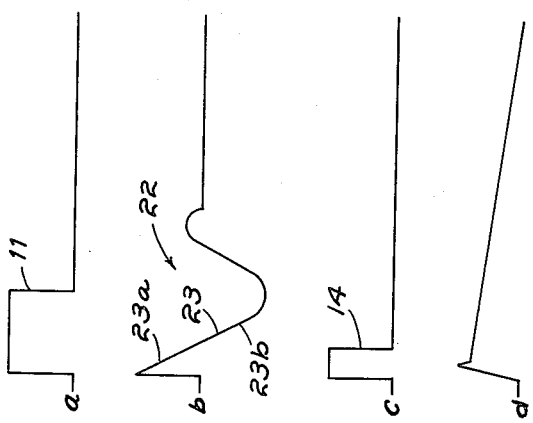
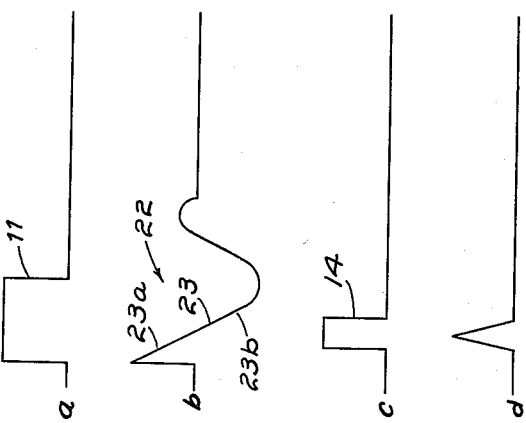

United States Patent Office 3,117,315
Patented Jan. 7, 1964

3,117,315
SIMPLIFIED PULSE ERROR DETECTOR
Kenneth J. Engholm, Cedar Rapids, and John B. Majerus, Marion, Iowa, assignors to Collins Radio Company, Cedar Rapids, Iowa, a corporation of Iowa
Filed June 22, 1960, Ser. No. 37,891
4 Claims. (Cl. 343—7.3)

This invention relates generally to an error detecting device and more particularly to a device for developing an error signal which reflects the time position of an incoming return pulse with respect to a range gate.

It is often desirable to measure the distance to a return pulse shown on a radar scope. This can be accomplished by superimposing a gate on the incoming return pulse and measuring the time between the transmission of the pulse and the occurrence of the gate. Ranging systems of this general type are shown and described in United States Patent No. 2,611,893, issued to David O. McCoy, Patent No. 2,614,218, issued to Noel W. Hancock, and Patent No. 2,760,189, issued to David O. McCoy and Noel W. Hancock, all of which patents are assigned to the assignee of this invention, and which patents may be referred to for a more complete description of ranging systems.

Heretofore, error detecting devices of the type contemplated by this invention were relatively complicated and generally required the use of at least a pair of sawtooth generators in order to produce the necessary direct voltage to cause the range gate to be shifted so as to be coincident with the incoming return pulse.

It is therefore an object of this invention to provide a relatively simple, yet efficient, error detecting device suitable for use in a ranging system.

More particularly it is an object of this invention to provide an error detecting device which utilizes a range gate generator and a single wave shaping circuit to develop therefrom a signal which may be compared to said incoming return pulse and thereby develop a direct voltage output the polarity of which is determined by the time position of said return pulse with respect to the center of said range gate.

Still more particularly it is an object of this invention to provide an error detector having a wave shaping circuit capable of receiving a range gate and providing an output signal having a substantially linear sloping portion that is both positive and negative with respect to a reference or zero axis, and a bridge circuit to which said incoming return pulse and the output from said wave shap-circuit may be applied to produce an output therefrom the polarity of which depends upon the time position of the return pulse with respect to the linear portion of the output from said wave shaping circuit.

It is a further object of this invention to provide an automatic device for use in a ranging system to automatically maintain a range gate centered with respect to an incoming return pulse.

It is still another object of this invention to provide a wave shaping circuit for an error detector which produces an output signal that has a substantially linear sloping portion, one part of which is positive with respect to a reference axis and the other part of which is substantially equal in length to said one part but is negative with respect to said reference axis.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed information may be included as come within the scope of the claims.

Figure 2:
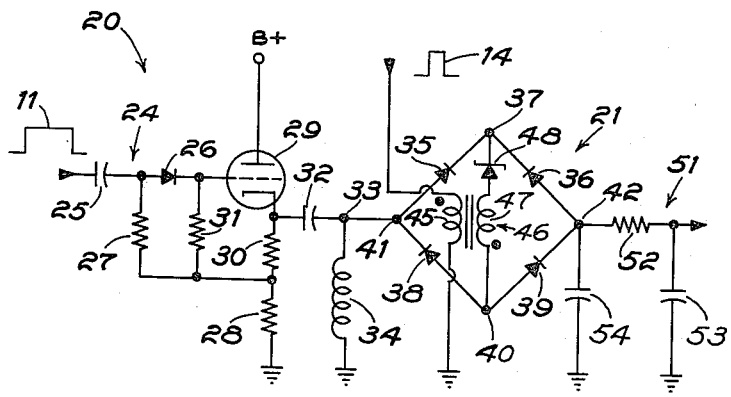

The accompanying drawings illustrate on complete example of the embodiment of the invention constructed according to the best mode so far devised for the practical application of the principles thereof, and in which:

FIGURE 1 is a block diagram of an automatic device for maintaining a range gate centered with respect to an incoming return distance pulse, FIGURE 2 is a schematic diagram of the error detecting device of this invention, FIGURE 3 is an illustration of the wave forms which may be present in the error detecting device of this invention when the range gate is coincident to and centered with respect to the incoming return distance pulse;

FIGURE 4 is an illustration of the wave forms which may be present in the error detecting device of this invention when the incoming return pulse timewise precedes the center of said range gate; and FIGURE 5 is an illustration of the wave forms which may be present in the error detector of this invention when the incoming distance return pulse is timewise later than the center of said range gate.

Referring now to the accompanying drawings in which like numerals have been used for like characters throughout, the numeral 7 refers generally to an automatic device for maintaining the range gate centered with respect to the incoming distance return pulse. This device may consist of an oscillator 8, which may for example, produce a constant output of 4046 c.p.s. This output may be coupled to a conventional phase shifter 9, the output of which may, in turn, be coupled to a range gate generator 10. Range gate generator 10 may be conventional and produces a square wave output or range gate 11 which may, for example, be of 20 microseconds width. Range gate 11 is applied to error detector 12 and to conventional coincidence means 13, which coincidence means also receives the incoming distance return pulse.

The output from coincidence means 13, which is a square wave as shown by wave form 14, is preferably of substantially less width than is range gate 11 and may, for example, be 7 microseconds in width. This output is applied to error detector 12 in a manner to be more fully brought out hereinafter.

The output from error detector 12 is a direct voltage output and may, as shown in FIGURE 1 and as is well known in the art, be applied through a servo amplifier 15 to servo motor 16. Servo motor 16 may be connected to takeoff potentiometer 17 and phase shifter 9, the former of which may also be connected to range gate generator 10, to complete the servo loop and thereby cause range gate 11 to be shifted timewise to maintain the center of said range gate coincident with respect to the incoming distance return pulse.

Error detector 12 comprises basically a wave shaping circuit 20 and a bridge circuit 21. Range gate 11 is applied to wave shaping circuit 20 and an output wave, as shown by 22 in FIGURE 1, having a substantially linear negative going sloping portion 23, is produced therefrom.

The output from range gate generator 10 may be directly coupled to differentiating network 24 of wave shaping circuit 20. Network 24 perferably consists of a serially connected capacitor 25 and diode 26 at the junction of which a resistor 27 is connected to ground through resistor 28. As shown in FIGURE 2, diode 26 has its anode connected to condensor 25 and removes any negative voltage due to differentiation from the grid of cathode follower 29 to which its cathode may be directly connected.

Cathode follower 29 may have its plate directly connected to a B+ power source and may have its cathode connected to ground through resistor 28 and load resistor 30. In addition, resistor 31 may be connected between the control grid and the junction between resistors 28 and 30 to provide bias for the tube.

The output from cathode follower 29 may be applied to capacitor 32 and lead 33 which lead has one end of an inductor 34 connected thereto, the other end of said inductor being grounded.

As shown in FIGURES 1 and 3 through 5, output wave 22, which is the output from wave shaping circuit 20, has a substantially linear sloping portion 23 substantially equal to the width of range gate 11. Due to the action of inductor 34, portion 23 has one part 23a that is positive with respect to a reference or zero axis and another part 23b of substantially equal length that is negative with respect to said axis. The action of inductor 34 determines the length of sloping portion 23 since diode 26 of differentiating circuit 24 removes any negative voltages due to differentiation, as brought out hereinabove. It has been found, however, that diode 26 may be deleted if the lagging edge of incoming range gate 11 is rounded, as is often true in practice, since differentiation of this rounded edge can be effectively utilized in establishing slope length. Thus with diode 26 deleted, the width of the range gate is also determinative of the length of sloping portion 23. In either case, however, the length of sloping portion 23 is substantially equal to the width of range gate 11 since this is the range in which comparison is made in bridge circuit 21.

Bridge circuit 21 has four substantially identical arms of branches and each arm includes a diode that is connected in opposition to the diode in one adjacent arm and in series with the diode in the other adjacent arm as is conventional in bridge circuits. As shown in FIGURE 2, diodes 35 and 36 have their cathodes connected at junction 37 while diodes 38 and 39 have their anodes connected at junction 40. To complete the bridge circuit, diodes 35 and 38 have opposite poles connected at junction 41 while diodes 36 and 39 have opposite poles connected at junction 42.

The output from wave shaping circuit 20 is coupled to junction 41 of bridge circuit 21. The incoming distance return pulse from coincidence means 13 is applied to the primary 45 of transformer 46, which transformer has one end of its oppositely phased secondary 47 connected to junction 40 of bridge circuit 21 and the other end of said secondary connected to junction 37 of bridge circuit 21 through a Zener, or breakdown, diode 48.

The output from bridge rectifier 21 is taken from junction 42 and may be applied to servo amplifier 15 through a low pass filter 51 which includes a resistor 52 and a grounded capacitor 53, as shown in FIGURE 2. In addition, a load capacitor 54 is connected between junction 42 and ground.

Normally, due to coincidence means 13, a return distance pulse will not be coupled to bridge circuit 21 unless a range gate is coincident therewith. However, should such a pulse be received by bridge circuit 21, in the absence of a coincident output wave 22 from wave shaping circuit 20, there will still be no output from the bridge circuit since it will at all times be balanced. Likewise, so long as output wave 22 does not exceed, in magnitude, the inverse voltage rating of the diodes, no output will be produced from bridge circuit 21 when only output wave 22 is received by said bridge circuit.

In operation, when range gate 11 is centered and coincident with return distance pulse 14, as shown in a and c of FIGURE 3, then the ramp or linear sloping portion 23 of output wave 22 will likewise be centered and coincident with return pulse 14 as shown by b of FIGURE 3. Since the return pulse 14 is equally coincident with both a positive and negative part of portion 23, capacitor 54 will charge equally positive and negative, or net zero charge, and therefore effectively produce no output. As shown by d of FIGURE 3, the charging and equal discharging of capacitor 54 may cause an output pip, but this pip is insufficient to cause actuation of servo motor 16.

When the incoming return pulse timewise precedes the center of the range gate, however, as shown in a and c of FIGURE 4, the linear portion 23 of output wave 22 will have its positive part or component 23a coincident to return pulse 14 as shown in b and c of FIGURE 4. This will cause capacitor 54 to charge positively through bridge circuit 21 and wave shaping circuit 20, which circuit includes inductor 34. As shown in d of FIGURE 4 this will produce a direct voltage output from error detector 12 that has a positive polarity. This in turn will cause motor 16 to operate and cause range generator 10 to shift range gate 11 so that the range gate is again centered with respect to the incoming return pulse.

If the incoming return pulse should be timewise later than the center of the range gate, as shown in a and c of FIGURE 5, then the negative section 23b of the linear portion 23 of output wave 22 will be coincident to the incoming return pulse, as shown in b and c of FIGURE 5. This will cause capacitor 54 to charge negatively through bridge circuit 21 and wave shaping circuit 20. As shown in d of FIGURE 5 this will produce a negative direct voltage output from error detector 12, and this output will turn motor 16 in the opposite direction from that described in connection with FIGURE 4 so as to cause range gate generator 10 to shift range gate 11 also in the opposite direction from that described in connection with FIGURE 4 and thereby maintain the centering of the range gate with respect to the incoming return pulse.

In view of the foregoing it should be evident to those skilled in the art that the error detector of this invention provides a relatively simple, yet efficient, means for developing an error signal which reflects the time position of an incoming return pulse with respect to a range gate.

What is claimed as our invention is:

1. In a ranging system, a device for developing an error signal which reflects the time position of an incoming return pulse with respect to a range gate, comprising: a wave shaping circuit including a differentiating network connected to receive said range gate, electron control means for receiving the output from said differentiating network, and inductance means connected to the output of said electron control means to produce an output signal from said wave shaping circuit having a linearly sloping portion that is of both positive and negative polarity with respect to the same zero axis as said range gate and having a time duration that is at least substantially equal to the time duration of said range gate; and means for receiving said incoming return pulse and the output signal from said wave shaping circuit, said means producing an output error signal the polarity of which is determined by the time position of said received incoming return pulse with respect to said linearly sloping portion of said output signal from said wave shaping circuit.

2. In a ranging system, a device for developing a direct voltage error signal which reflects the time position of an incoming return pulse with respect to a square wave range gate, comprising: a wave shaping circuit having a differentiating network for receiving said range gate, electron control means having an input electrode for receiving the output from said differentiating network and an output electrode, and inductance means connected to the output electrode of said electron control means whereby the output from said wave shaping circuit has a substantially linear sloping portion that is of both positive and negative polarity with respect to the same zero axis as said range gate, the time duration of said linear sloping portion being at least substantially equal to the time duration of said range gate; a bridge circuit having four arms each of which includes a unilateral conductive device; means for coupling said incoming return pulse to opposite junctions of said bridge circuit; means for coupling the output from said wave shaping circuit to a third junction of said bridge circuit; and means for coupling a direct voltage output signal from said bridge circuit, the polarity of which signal depends upon the time position of said return pulse with respect to the linear portion of the output of said wave shaping circuit.

3. In a ranging system, a device for developing an error signal which reflects the relative time positions of an incoming return pulse and a range gate, comprising: a wave shaping circuit for receiving said range gate and forming therefrom an output signal having a substantially linear sloping portion that is of a time duration substantially equal to said range gate and has substantially equal parts, one of which is of positive polarity and the other of which is of negative polarity with respect to the same zero axis as said range gate; and means for receiving said incoming return pulse and forming a single substantially square wave thereof that is of a time duration substantially less than that of said range gate, said means being connected to said wave shaping circuit to also receive the output therefrom whereby said means produces an output error signal the polarity of which is determined by the coincidence of said square wave with one said part of the linear sloping portion of said wave shaping circuit.

4. In a ranging system, a device for developing an error signal which reflects the relative time positions of a range gate and an incoming return pulse, comprising: a differentiating network for receiving a square wave range gate; a cathode follower having its grid connected to said differentiating network; inductance means connected to the cathode of said cathode follower; a bridge circuit having four arms each of which includes a diode with each said diode in opposing relation to one adjacent diode and in series with the other adjacent diode; means connecting the junction between said inductance means and the cathode of said cathode follower to the junction between two said series connected diodes; the signal coupled through said last named means having a linear sloping portion which is of both positive and negative polarity with respect to the same zero axis as said range gate, said linear sloping portion having a time duration substantially equal to the time duration of said square wave range gate; transformer means the primary of which receives said incoming return pulse and the secondary of which is connected between the junctions of said opposing diodes; and means connected to the junction between the other two series connected diodes for coupling an output signal therefrom.

References Cited in the file of this patent

UNITED STATES PATENTS

| | | |
|---|---|---|
| 2,638,587 | Ballard | May 12, 1953 |
| 2,713,160 | Trachtenberg et al. | July 12, 1955 |
| 2,724,776 | Sherwin | Nov. 22, 1955 |
| 2,760,189 | McCoy et al. | Aug. 21, 1956 |
| 2,807,015 | Shank | Sept. 17, 1957 |
| 2,824,230 | Fathauer | Feb. 18, 1958 |
| 2,815,447 | Dunham et al. | Dec. 3, 1959 |
| 2,957,943 | Rack | Oct. 25, 1960 |
| 2,975,299 | Mintzer | Mar. 14, 1961 |